United States Patent
Short

(10) Patent No.: US 7,110,547 B2
(45) Date of Patent: Sep. 19, 2006

(54) METHOD AND APPARATUS FOR THE COMPRESSION AND DECOMPRESSION OF IMAGE FILES USING A CHAOTIC SYSTEM

(75) Inventor: Kevin M. Short, Durham, NH (US)

(73) Assignee: University of New Hampshire, Durham, NH (US)

( * ) Notice: Subject to any disclaimer, the term of this patent is extended or adjusted under 35 U.S.C. 154(b) by 976 days.

(21) Appl. No.: 09/756,814

(22) Filed: Jan. 9, 2001

(65) Prior Publication Data

US 2003/0169940 A1    Sep. 11, 2003

Related U.S. Application Data

(63) Continuation-in-part of application No. 09/597,101, filed on Jun. 20, 2000, now abandoned.

(51) Int. Cl.
*H04L 9/00*    (2006.01)
(52) U.S. Cl. ......................... 380/263; 380/46
(58) Field of Classification Search ................ 380/263, 380/28, 46, 217, 269; 84/603; 382/249; 708/203
See application file for complete search history.

(56) References Cited

U.S. PATENT DOCUMENTS

| | | | |
|---|---|---|---|
| 4,941,193 A * | 7/1990 | Barnsley et al. ............. 382/249 |
| 5,040,217 A | 8/1991 | Brandenburg et al. |
| 5,048,086 A | 9/1991 | Bianco |
| 5,245,660 A | 9/1993 | Pecora et al. |
| 5,291,555 A | 3/1994 | Cuomo et al. |
| 5,347,600 A * | 9/1994 | Barnsley et al. ............. 382/249 |
| 5,365,589 A | 11/1994 | Gutowitz |
| 5,416,848 A | 5/1995 | Young |
| 5,432,697 A | 7/1995 | Hayes |
| 5,473,694 A | 12/1995 | Carroll et al. |
| 5,479,512 A | 12/1995 | Weiss |
| 5,508,473 A | 4/1996 | Chafe |
| 5,592,555 A | 1/1997 | Stewart |
| 5,606,144 A | 2/1997 | Dabby |

(Continued)

FOREIGN PATENT DOCUMENTS

EP    1244274 A1    9/2002

(Continued)

OTHER PUBLICATIONS

David Boothroyd, Chaos Systems: Electronic Application Reap the Benefits, New Electronics, vol. 27, Oct. 25, 1994, pp. 20-24.*

(Continued)

*Primary Examiner*—Hosuk Song
*Assistant Examiner*—T. B. Truong
(74) *Attorney, Agent, or Firm*—Fish & Neave IP Group Ropes & Gray LLP

(57) ABSTRACT

A system for the compression and decompression of image files is provided. A library of basic waveforms is produced by applying selected digital initialization codes to a chaotic system. Each basic waveform is in one-to-one correspondence with an initialization code. A weighted sum of selected basic waveforms is used to approximate each slice of an image. The basic waveforms are then discarded and only the weighting factors and the corresponding initialization codes are stored in a compressed image file. When the compressed image file is decompressed for playback, the stored initialization codes are stripped out and applied to a similar chaotic system to regenerate the basic waveforms, which are recombined according to the stored weighting factors to produce an approximation of the original image slice.

44 Claims, 9 Drawing Sheets

U.S. PATENT DOCUMENTS

| | | | |
|---|---|---|---|
| 5,661,788 | A | 8/1997 | Chin et al. |
| 5,680,462 | A | 10/1997 | Miller |
| 5,729,607 | A | 3/1998 | DeFries et al. |
| 5,732,158 | A | 3/1998 | Jaenisch |
| 5,737,360 | A | 4/1998 | Grinstein et al. |
| 5,768,437 | A | 6/1998 | Monro et al. |
| 5,774,385 | A * | 6/1998 | Bristol ............... 708/203 |
| 5,808,225 | A | 9/1998 | Corwin et al. |
| 5,818,712 | A | 10/1998 | Glenn |
| 5,838,832 | A | 11/1998 | Barnsley |
| 5,857,025 | A | 1/1999 | Anderson |
| 5,857,165 | A | 1/1999 | Coron et al. |
| 5,923,760 | A | 7/1999 | Abarbanel et al. |
| 6,137,045 | A | 10/2000 | Short et al. |
| 6,178,217 | B1 | 1/2001 | Defries et al. |
| 6,208,951 | B1 | 3/2001 | Kumar et al. |
| 6,212,239 | B1 | 4/2001 | Hayes |
| 6,249,810 | B1 | 6/2001 | Kiraly |
| 6,275,615 | B1 | 8/2001 | Ida et al. |
| 6,363,153 | B1 | 3/2002 | Parker et al. |
| 6,374,177 | B1 | 4/2002 | Lee et al. |
| 6,546,427 | B1 | 4/2003 | Ehrlich |
| 6,587,563 | B1 | 7/2003 | Crandall |
| 6,631,166 | B1 | 10/2003 | Carroll |
| 6,725,022 | B1 | 4/2004 | Clayton et al. |
| 6,744,893 | B1 * | 6/2004 | Fleming-Dahl ............. 380/263 |
| 6,799,201 | B1 | 9/2004 | Lee et al. |
| 6,829,475 | B1 | 12/2004 | Lee et al. |
| 6,980,656 | B1 | 12/2005 | Hinton, Sr. et al. |
| 2001/0012365 | A1 | 8/2001 | Gaedke et al. |
| 2002/0001381 | A1 | 1/2002 | Ukyo |
| 2002/0046084 | A1 | 4/2002 | Steele et al. |
| 2002/0059592 | A1 | 5/2002 | Kiraly |
| 2002/0154770 | A1 | 10/2002 | Short |
| 2002/0164032 | A1 | 11/2002 | Short |
| 2004/0039796 | A1 | 2/2004 | Watkins |

FOREIGN PATENT DOCUMENTS

| | | |
|---|---|---|
| EP | 1260949 A1 | 11/2002 |
| JP | 04-097197 | 3/1992 |
| JP | 06-089106 | 3/1994 |
| JP | 07-084580 | 3/1995 |
| JP | 07-140983 | 6/1995 |
| JP | 10-143162 | 5/1998 |
| JP | 09-218683 | 8/1998 |
| JP | 11-219185 | 8/1999 |
| WO | WO 99/42990 | 6/1999 |
| WO | WO-99/43136 A1 | 8/1999 |
| WO | WO 01/31839 | 5/2001 |
| WO | WO 02/065386 | 8/2002 |
| WO | WO-03/003235 A1 | 1/2003 |

OTHER PUBLICATIONS

Dedieu et al., "Signal coding and Compression Based on Chaos Control Techniques," IEEE, 1995, pp. 1191-1194, XP002325883.
Carroll et. al., "Synchronizing Chaotic Systems", SPIE Chaos in Communications 32-43, 1993.
Carroll, Thomas L., "Communicating with Use of Filtered, Synchronized Chaotic Signals", IEEE Transactions on Circuits and Systems I: Fundamental Theory and Applications, vol. 42, No. 3, pp. 105-110, Mar. 1995.
Cuomo et. al., "Synchronization of Lorenz-Based Chaotic Circuits with Applications to Communications", IEEE Transactions on Circuits and Systems, 626-633, 1993.
Dachselt, F., "Chaotic Coding and Cryptoanalysis", IEEE International Symposium on Circuits and Systems, Jun. 9-12, 1997, Hong Kong, pp. 1061-1064.
Ding, M. et al., "Enhancing Synchronism of Chaotic Systems," Physical Review E, vol. 49, No. 2, pp. R945-948, Feb. 1994.
Final office action issued on Dec. 21, 2000, In the prosecution of U.S. Appl. No. 09/436,910, now issued as U.S. Patent No. 6,363,153 (Method and apparatus for secure digital chaotic communication).
Hayes, S., Grebogi, C., and Ott, E., "Communicating with Chaos", Phys. Rev. Lett., vol. 70, No. 20, pp. 3031-3034, May 17, 1993.
Hayes, S., Grebogi, C., and Ott, E., "Experimental Control of Chaos for Communication", Phys. Rev. Lett., vol. 73, No. 13, pp. 1781-1786, Sep. 26, 1994.
Hunt, E. R., "Stabilizing High-Period Orbits in a Chaotic System: The Diode Resonator", Physical Review Letters, vol. 67, No. 15, pp. 1953-1957, Oct. 7, 1991.
Kavitha, V. et al., "Use of Chaotic Modeling for Transmission of EEG Data", International Conference on Information, Communications, and Signal Processing, ICICS '97, Singapore, Sep. 9-12, 1997, pp. 1262-1265.
Kruger, P. "Barbarian at the Gates?", Communications International, pp. 46-48, Jan. 1996.
Lai, "Synchronization of a Chaotic Optical System Using Control", SPIE Chaos in Communication, pp. 91-102, 1993.
Martienssen, W., "Chaotic Cryptology", Annalen der Physik, vol. 4, Issue 1, 1995, pp. 35-42.
Non-final office action issued on Apr. 2, 2000, in the prosecution of U.S. Appl. No. 09/436,910, now issued as Patent No. 6,363,153 (Method and apparatus for secure digital chaotic communication).
Non-final office action issued on Dec. 17, 1999, in the prosecution of U.S. Appl. No. 09/437,565, now issued as U.S. Patent No. 6,137,045 (Method and apparatus for chaotic musical synthesis).
Ott, E. et al., "Controlling Chaos", Physical Review Letters, vol. 64, No. 11, pp. 1196-1199, Mar. 12, 1990.
Pecora et al., "Synchronization in Chaotic Systems", Physical Review Letters, vol. 64, No. 8, pp. 821-824, Feb. 19, 1990.###(ISR incorrectly cites No. 10, pp. 2374-2383).
Rossler, O. E., "An Equation for Continuous Chaos", Physics Letters A, vol. 57, No. 5, pp. 397-398, Jul. 12, 1976.
Shilnikov, "Mathematical Problems of Nonlinear Dynamics: A Tutorial", International Journal of Bifurcation and Chaos, vol. 7, No. 9, pp. 1953-2001, 1997.
Short, K., "Steps Towards Unmasking Secure Communications," International Journal of Bifurication and Chaos, vol. 4, No. 4, 1994, pp. 959-977.
Yang et al., "Secure Communication via Chaotic Parameter Modulation", IEEE Transactions on Circuits and System 817-819, 1996.
Yang, T. et al., "Cryptanalyzing Chaotic Secure Communications Using Return Map", Physics Letters A, vol. 245, No. 6, pp. 495-510, Aug. 31, 1998.###(ISR citation was incorrect and incomplete: No vol. no., no date, incorrect pp.).
Yang, Tao, "A Survey of Chaotic Secure Communication Systems", International Journal of Computational Cognition, vol. 2, No. 2, pp. 81-130, Jun. 2004. (http://www.YangSky.com/yangijcc.htm).
Zhou, C., "Extracting Information Masked by Chaos and Contaminated with Noise: Some Considerations on Security of Communication Approaches Using Chaos", Physics Letters A, vol. 234, No. 6, pp. 429-435, Oct. 13, 1997.
Alvarez, et al, "Chaotic Cryptosystems," Institute of Electrical and Electronics Engineers, Proc. 33rd Annual 1999 International Carnahan Conference on Security Technology, (ICCST) Madrid, Spain, Oct. 5-7, 1999, IEEE, US vol. Conf 33, Oct. 5, 1999 (Oct. 5, 1999), pp. 332-338, XP001003771, ISBN: 0-7803-5248-3.
Newell, et al., "Synchronization of Chaos Using Proportional Feedback," SPIE Chaos in Communications, 1993, pp. 115-130.
Degazio, "Towards a Chaotic Musical Instrument," ICMC Proceedings, pp. 393-395, (1993).
"Cubic Oscillator Explorer v0.51," http://web.archive.org/web/20010211000709/www.ks.rus.uni-stuttgart.de/people/sch. . . , (Oct. 20, 2005).

* cited by examiner

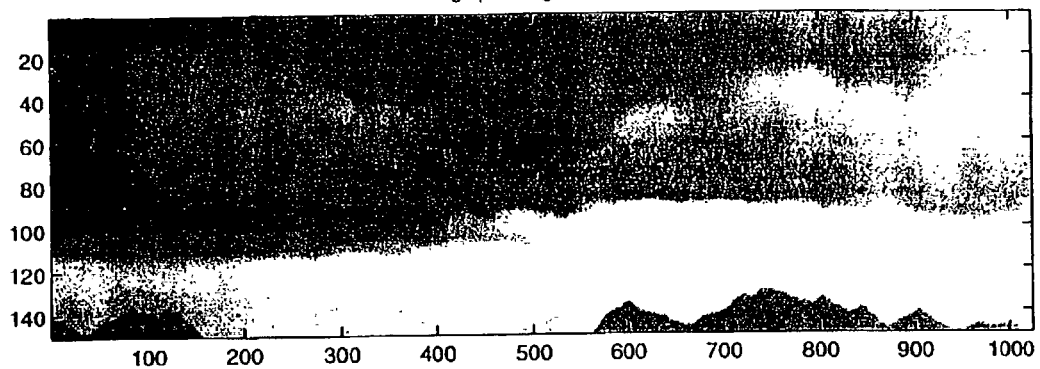
Fig. 7 – Original Image
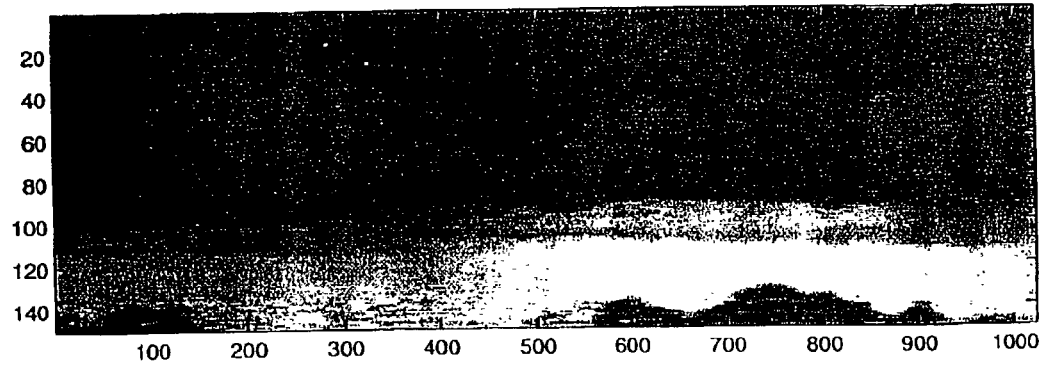
Fig. 11 – Compressed Image

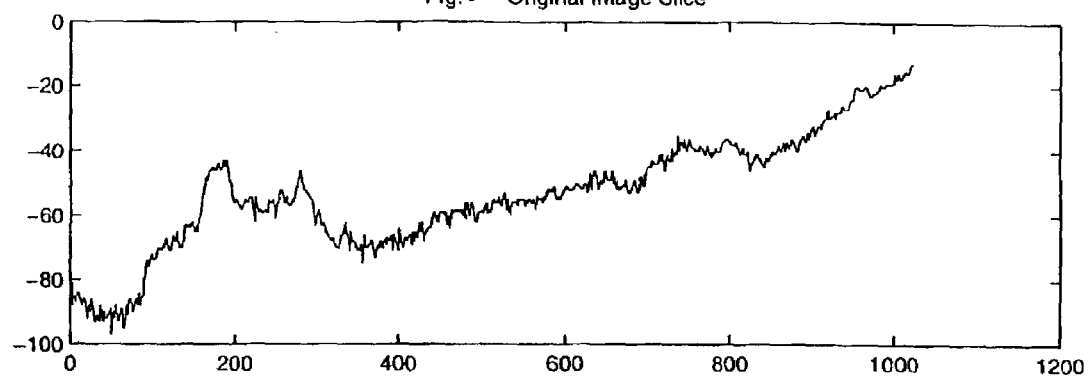
Fig. 9 – Original Image Slice
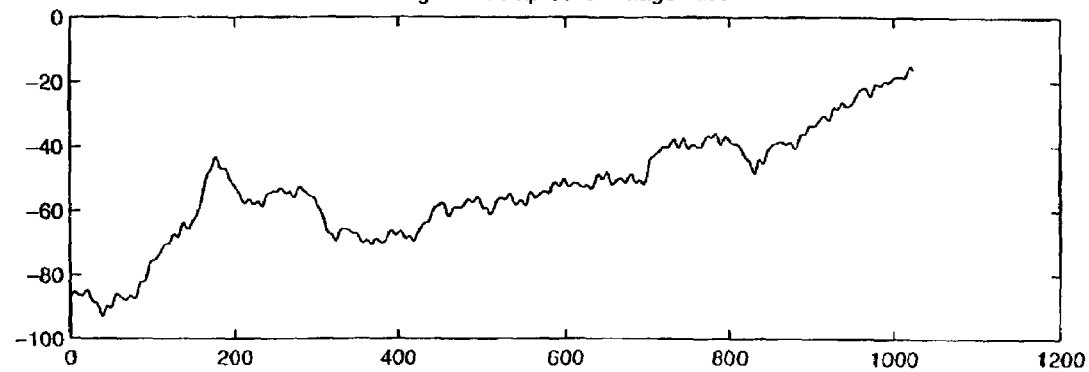
Fig. 10 – Compressed Image Slice

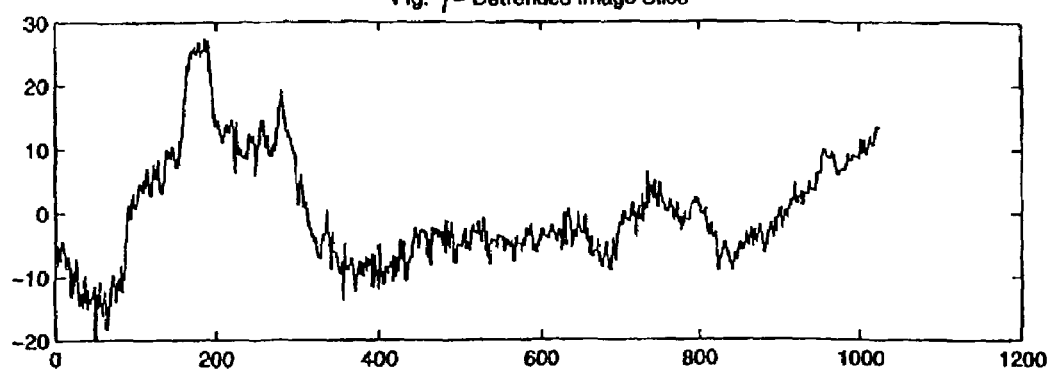
Fig. 9 – Detrended Image Slice

METHOD AND APPARATUS FOR THE COMPRESSION AND DECOMPRESSION OF IMAGE FILES USING A CHAOTIC SYSTEM

This application is a Continuation-In-Part of currently pending Short—Method and Apparatus for the Compression and Decompression of Audio Files Using A Chaotic System—application Ser. No. 09/597,101 filed Jun. 20, 2000.

FIELD OF THE INVENTION

The present invention relates generally to a method and apparatus for the efficient compression and decompression of image files using a chaotic system. More specifically, it relates to a system for approximating an image file with basic waveforms produced by applying selected digital initialization codes to a chaotic system and further processing the initialization codes to produce a compressed image file.

BACKGROUND OF THE INVENTION

In general, a chaotic system is a dynamical system which has no periodicity and the final state of which depends so sensitively on the system's precise initial state that its time-dependent path is, in effect, long-term unpredictable even though it is deterministic.

One approach to chaotic communication, Short, et al., *Method and Apparatus for Secure Digital Chaotic Communication*, U.S. patent application Ser. No. 09/436,910 ("Short I"), describes a chaotic system controlled by a transmitter/encoder and an identical chaotic system controlled by a receiver/decoder. Communication is divided into two steps: initialization and transmission. The initialization step uses a series of controls to drive the identical chaotic systems in the transmitter/encoder and receiver/decoder into the same periodic state. This is achieved by repeatedly sending a digital initialization code to each chaotic system, driving each of them onto a known periodic orbit and stabilizing the otherwise unstable periodic orbit. The necessary initialization code contains less than 16 bits of information. The transmission step then uses a similar series of controls to steer the trajectories of the periodic orbits to regions of space that are labeled 0 and 1, corresponding to the plain text of a digital message.

Short, et al., *Method and Apparatus for Compressed Chaotic Music Synthesis*, U.S. Pat. No. 6,137,045 ("Short II"), describes the use of such an initialization step to produce and stabilize known periodic orbits on chaotic systems, which orbits are then converted into sounds that approximate traditional music notes. By sending a digital initialization code to a chaotic system, a periodic waveform can be produced that has a rich harmonic structure and sounds musical. The one-dimensional, periodic waveform needed for music applications is achieved by taking the x-, y-, or z-component (or a combination of them) of the periodic orbit over time as the chaotic system evolves. The periodic waveform represents an analog version of a sound, and by sampling the amplitude of the waveform over time, e.g., using audio standard PCM 16, one can produce a digital version of the sound. The harmonic structures of the periodic waveforms are sufficiently varied that they sound like a variety of musical instruments.

Short, *Method and Apparatus for the Compression And Decompression of Audio Files*, U.S. patent application Ser. No. 09/597,101 ("Short III") describes the creation of a library of basic waveforms associated with a chaotic system by applying selected digital initialization codes to the chaotic system. Each initialization code is in one-to-one correspondence with a specific basic waveform, allowing the use of the corresponding initialization code to represent the basic waveform. The basic waveforms are then used to approximate a section of audio file.

The basic waveforms that are most closely related to the section of audio file are selected, and a weighted sum of the selected basic waveforms is used to approximate the section of audio file. Once a weighted sum is produced that approximates the section of audio file to a specified degree of accuracy, the basic waveforms can be discarded and only the weighting factors; the corresponding initialization codes; and certain frequency information are stored in a compressed audio file. The compressed audio file may also contain other implementation-dependent information, e.g. header information defining sampling rates, format, etc. When the compressed audio file is decompressed for playback, the initialization codes are stripped out and used to regenerate the basic waveforms, which are recombined according to the weighting factors in the compressed audio file to reproduce an approximation of the original section of audio file.

The present invention is a system for compression and decompression of image files. An image file may exist in any one of a number of commercially available formats, e.g. grayscale format, "yuv" format, "rgb" format, or any of a number of other formats in general use. In the grayscale format, the gray level is the sole variable, and each image in the image file represents a 2-dimensional matrix in which each position carries information about the gray level, which is just the degree of darkness on a scale of a fixed number of possible shades of gray, scaling from white to black. In the "rgb" format, every position in the 2-dimensional matrix carries information about the red level, green level and blue level, which is just the degree of intensity on the color scale. In the "yuv" format, one of the dimensions is a gray scale level, and the remaining two dimensions represent color levels.

The primary feature that separates an image file from time series data produced in an audio file is that the data in an image file comes in disconnected "slices," where the term slice denotes a single vertical or horizontal scan line on an analog screen or a single vertical or horizontal line of pixels in a digital image. For example, if the digital image is 1280×1024 pixels, there are 1280 rows, or slices, of 1024 pixels. Thus, the maximum slice length is externally imposed in an image application, and compression can be done on a slice of maximum length or on any portion thereof.

The first step in image file compression is to decompose an image first into slices of maximum length or any portion therof desired. The process is simplest to picture in the grayscale format, where the two-dimensional pixel matrix just has a single entry (the grayscale level) at each position in the matrix. In the "rgb" format, for example, it is best to picture the data in 3 separate two-dimensional pixel matrices. Each two-dimensional matrix would contain just the color level for a single color Forming a slice from one of the matrices is simply a matter of extracting a single row or column at a time. The data on each slice is either the gray level at each position on the slice if it is in grayscale format; the red level, green level or blue level at each position on the slice if it is in "rgb" format; or the gray level, first color level, or second color level in the "yuv" format.

The slice data differs from the time series data in an audio file in one important respect. Audio file data tends to be almost periodic on short time scales and oscillates around a zero. The slice data, which is a color level, often shows a definite trend, either increasing or decreasing over an extended span of pixels. It does not necessarily appear oscillatory and does not necessarily have the short-term periodic structure of chaotic waveforms. The solution to this problem can be achieved by taking the slice data and removing the trend line from the data to produce a detrended image slice. In the cases where there is a discontinuity in the trend of the data across the slice, one can break the slice up into a small number of shorter slices and remove the trend from the shorter slices. In one embodiment, the trend line may be replaced by a spline curve fit to the data or any other simple functional approximation of the large scale trends in the data. In another embodiment, the data on the slice is considered to be a one-dimensional collection of ordered data points, and a best-fit least squares regression line is calculated to fit the data. This best-fit line is the trend line, and once it is subtracted from the data, the residual difference, or detrended image slice, formed by subtracting the trend line from the image slice is oscillatory in nature. Trend line information describing the trend line is stored. The detrended image slice is now suitable for compression onto chaotic waveforms, following a procedure described below similar to that described in Short III.

In summary, a library of basic waveforms associated with a chaotic system is produced, by applying selected digital initialization codes to the chaotic system. The basic waveforms that can be produced with 16-bit initialization codes range from simple cases that resemble the sum of a few sine waves with an associated frequency spectrum containing only two or three harmonics, to extremely complex waveforms in which the number of significant harmonics is greater than 100. Importantly, the initialization codes are 16 bits regardless of whether the basic waveforms are simple or complex. By contrast, in a linear approach, one would expect the number of bits necessary to produce a waveform to be proportional to the number of harmonics in the waveform. The number of harmonics present in the waveforms is directly tied to the complexity of the structure, and it is generally true that if there are many harmonics in a waveform, there is more fine structure present in the waveform. This makes it possible to match the rapid variation often present in the detrended image slices and, further, since the spectral content of any sharp edges in a detrended image slice requires a high number of harmonics to reproduce the sharp edge, the fact that the chaotic waveforms have high harmonic content means that they are naturally suited to image reproduction. Equally importantly, each initialization code is in one-to-one correspondence with a specific basic waveform, allowing the use of the corresponding initialization code to represent the basic waveform. Then basic waveforms selected from the library are used to approximate a detrended image slice.

The basic waveforms that are most closely related to the detrended image slice are selected, and all the selected basic waveforms and the detrended image slice are transformed to a proper frequency range. Then, a weighted sum of the selected basic waveforms is used to approximate the detrended image slice. Once a weighted sum is produced that approximates the detrended image slice to a specified degree of accuracy, the basic waveforms can be discarded. Only the corresponding initialization codes; the weighting factors, the trend line information, and certain phase and frequency information described below are stored in a compressed image file. Once the detrended image slices from all the slices of an image file have been compressed, the processing can advance to the next image in the image file. The compressed image file may also contain other implementation-dependent information, e.g. header information defining aspect ratios, trend line specifications (e.g. slope and intercept) format, etc. When the compressed image file is decompressed for playback, the initialization codes are stripped out and used to regenerate the basic waveforms, which are transformed to the proper frequency range and recombined according to the weighting factors in the compressed image file to reproduce the detrended image slice. The trend line information is then read from the compressed image file and the trend across the original slice is then regenerated and added back to the detrended image slice. This reproduces an approximation of the original image slice.

The compressed image file can be transmitted, or stored for later transmission, to an identical chaotic system for decompression at a remote location. In practice, the remote location does not need the compression part of the system and would only use the decompression part of the system if playback of the image file is all that is desired.

A further degree of compression is often possible and desirable. After finding a suitable weighted sum of basic waveforms, the weighted sum can be examined and any waveforms that contribute less to the overall approximation than a specified threshold can be eliminated. When such waveforms are identified, the corresponding initialization codes can be removed from the compressed image file. Also, because the compression may be done on sequences of image, it is possible to look at the basic waveforms and the corresponding initialization codes to determine if there is a predictable pattern to the changes from image to image in the sequence . If such patterns are detected, further compression of the compressed image file can be achieved by storing only the requisite initialization code and information about the pattern of changes for subsequent images.

It is an object of the present invention to create compressed image files for distribution over the Internet. Compression ratios at better than 50-to-1 may be possible, which will allow for the transmission of image files over the Internet with greatly improved download speed. Compression of grayscale images is the most problematic application for image compression because the human eye is extremely sensitive to variations in light/dark levels. Consequently, in standard compression of grayscale image files, the data is either uncompressed, compressed at a ratio of 2:1 or compressed at a higher level with the realization that the image will be greatly degraded. Using the chaotic compression technique, it has been possible to compress 8-bit grayscale images by approximately 10:1, which would translate to approximately 20:1 for 16-bit grayscale images.

It is yet another object of the present invention to create compressed image files that are encrypted. For example, image files compressed with the present invention are naturally encrypted in accordance with Short I. In order to be able to decompress properly a compressed image file, it is necessary to have the proper chaotic decompressor. These decompressors can be distributed freely or to a group of registered users, thus allowing for some control over the distribution and reproduction of the compressed image files. Even greater control of the uses of the compressed image files can be achieved by incorporating a secondary layer of a secure chaotic distribution channel, using the technology described in Short I, to encode the digital bits of the compressed image files before transmitting them to a user. Since registered users can be given unique chaotic decoders, it will be possible to place a "security wrapper" around the compressed image files, so that only a registered user will be able to access it. It will also be possible to structure the security wrapper so that a movie file can be played a given number of times after paying a fee.

SUMMARY OF THE INVENTION

A new system for the compression and decompression of image files is provided. An image file may exist in any one of a number of common formats. An image from the image file is then decomposed into "slices," a single scan line on an analog screen or a single line of pixels in a digital image. The maximum length of the slice is externally imposed by the size of the image, but a shorter slice may be selected. The data on the slice is either the gray level at each position or the color level at each position.

The data on the slice is then considered as a one-dimensional collection of ordered data points, and the slices can be made suitable for compression with chaotic waveforms by a simple detrending step. A trend line is calculated and trend line information describing the trend line is stored. The trend line is then removed from the slice to produce a detrended image slice. In one embodiment, the detrending step, includes calculating a best-fit least squares regression line to fit the data. This best-fit line is the trend line, and once it is subtracted from the data, the residual data, or detrended image slice, is oscillatory in nature. The detrended image slice is suitable for approximation by basic waveforms. Also, more complicated general trends can be removed by using spline functions or other simple functions to approximate the overall trend line.

A library of basic waveforms is produced by applying selected digital initialization codes to a chaotic system. Each initialization code produces and stabilizes an otherwise unstable periodic orbit on the chaotic system. The basic waveforms needed are achieved by taking the x-, y-, or z-component (or a combination of them) of the periodic orbits over time. The basic waveforms that can be produced with 16-bit initialization codes range from simple to complex, and each basic waveform is in one-to-one correspondence with an initialization code.

The basic waveforms in the library that are most closely related to the detrended image slice to be compressed are selected and all the selected basic waveforms and the detrended image slice are transformed to a proper frequency range. Then, a weighted sum of the selected basic waveforms is used to approximate the detrended image slice. Once such a weighted sum is produced to approximate the detrended image slice to a specified degree of accuracy, the basic waveforms can be discarded and only the corresponding initialization codes, the weighting factors, the trend line information, and certain phase and frequency information are stored in a compressed image file. Once all the slices of an image have been compressed, the processing can advance to the next image in the image file. When the compressed image file is decompressed for playback, the stored initialization codes are stripped out and used to regenerate the basic waveforms, which are transformed to the proper frequency range and combined according to the stored weighting factors to reproduce the detrended image slice. The trend line information is then used to regenerate the trend line which is added to the detrended image slice to produce an approximation of the original image slice.

A further degree of compression may be achieved if, after finding a suitable weighted sum of basic waveforms, any basic waveforms may be eliminated. Also, because the compression may be done on sequences of image, it is possible to look at the basic waveforms and the corresponding initialization codes to determine if there is a predictable pattern to the changes from image to image in the sequence. If such patterns are detected, further compression of the compressed image file can be achieved by storing only the requisite initialization codes and information about the pattern of changes for subsequent images.

The foregoing and other objects, features and advantages of the present invention will be apparent from the following detailed description of preferred embodiments of the invention as illustrated in the accompanying drawings.

IN THE DRAWINGS

FIG. 7 is a grayscale image file.

FIG. 8 is a plot of the data for a single slice of the grayscale image file shown in FIG. 7.

FIG. 9 is a plot of the slice shown in FIG. 8 after detrending.

FIG. 10 is a plot of a first approximation of the slice shown in FIG. 8 using chaotic waveforms.

FIG. 11 is a plot of all the slices of the grayscale image shown in FIG. 7 using chaotic waveforms.

DETAILED DESCRIPTION OF THE INVENTION

Figure 1:
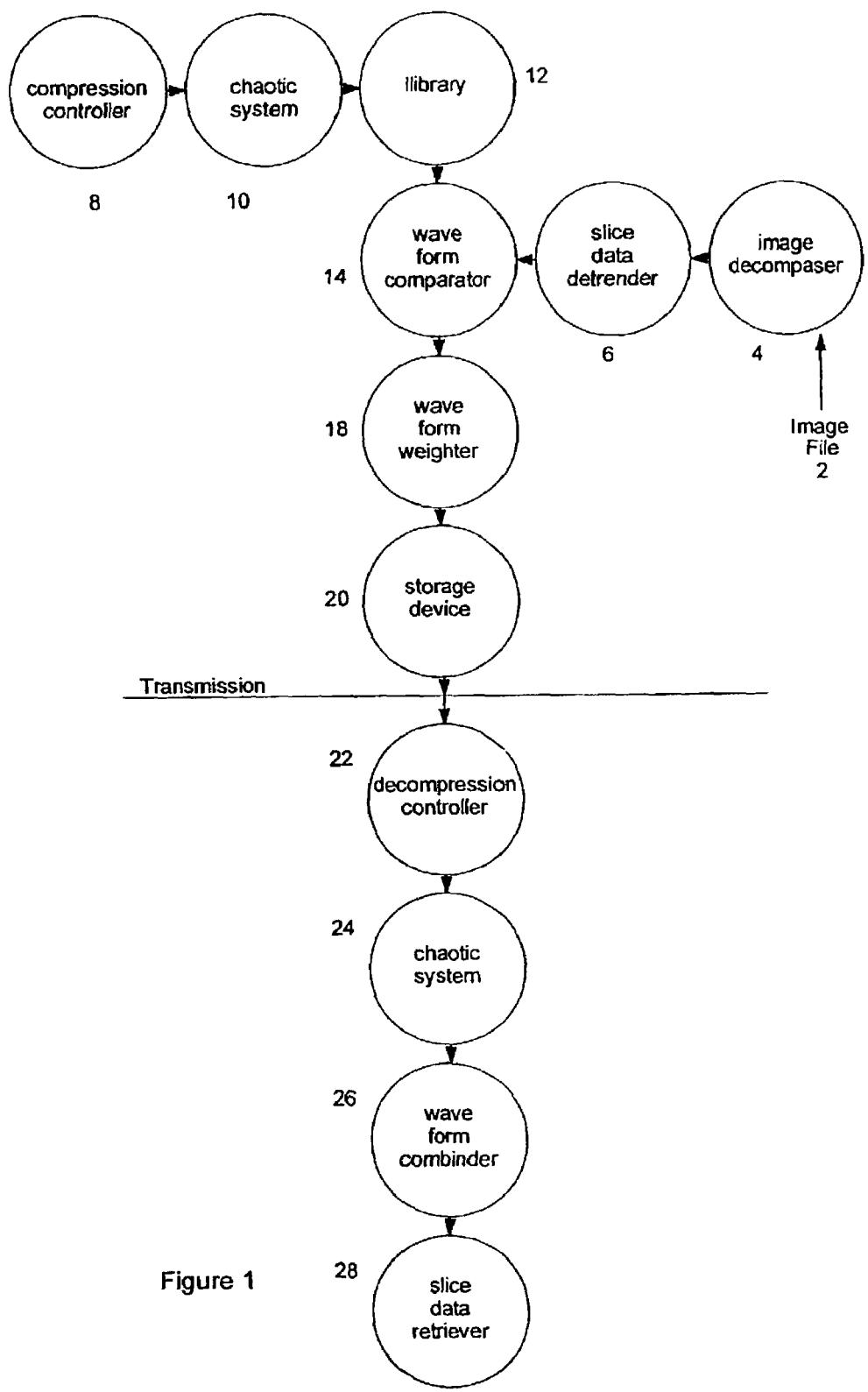
FIG. 1 is a block diagram of a compression and decompression system for image files according to an embodiment of the present invention.

A block diagram of an embodiment of the present invention is contained in FIG. 1. The system 1 for compression and decompression of image files comprises an image file 2 stored in any one of a number of common formats and an image decomposer 4 for decomposing an image from the image file into "slices," single scan lines on an analog screen or single rows of pixels in a digital image. The maximum length of the slice is externally imposed by the size of the image but multiple shorter slices comprising the maximum length may be selected.

The slice of the image is then processed by a slice data detrender 6, in which a trend line is calculated and trend line information describing the trend line is stored in storage device 20. The trend line is subtracted from the slice data, and the residual difference, or detrended image slice, is held.

A compression controller 8 applies selected digital initialization codes to a selected chaotic system 10. Each initialization code produces a basic waveform that is stored in a library 12 with its corresponding initialization code. The detrended image slice from an image slice to be compressed is analyzed in a waveform comparator 14, which then selects the basic waveforms and their corresponding initialization codes in the library 12 that are most closely related to the detrended image slice to be compressed and transforms all the selected basic waveforms and the detrended image slice to a proper frequency range. A waveform weighter 13 then generates a weighted sum of the selected basic waveforms to approximate the detrended image slices and the weighting factors necessary to produce the weighted sum. The basic waveforms are then discarded and the corresponding initialization codes, certain phase and frequency information and the weighting factors, are stored in the storage device 20. The stored trend line information, initialization codes, phase and frequency information and weighting factors comprise a compressed image file.

For decompression and playback, the compressed image file is transmitted to a remote decompression controller 22, which strips out the stored initialization codes and applies them to a chaotic system 24 that is identical to the chaotic system 10 used in compression. Each initialization code produces a basic waveform that is sent to a waveform combiner 26. The decompression controller also sends the stored phase and frequency information and weighting factors from the compressed image files to the waveform combiner 26. The basic waveforms are transferred to the proper frequency range and combined in the waveform combiner 26 according to the weighting factors to reproduce the original detrended image slice The detrended image slice is then processed by a slice data retriever 28 in which the trend line is added to the detrended image slice to produce an approximation of the original image slice.

Figure 2:
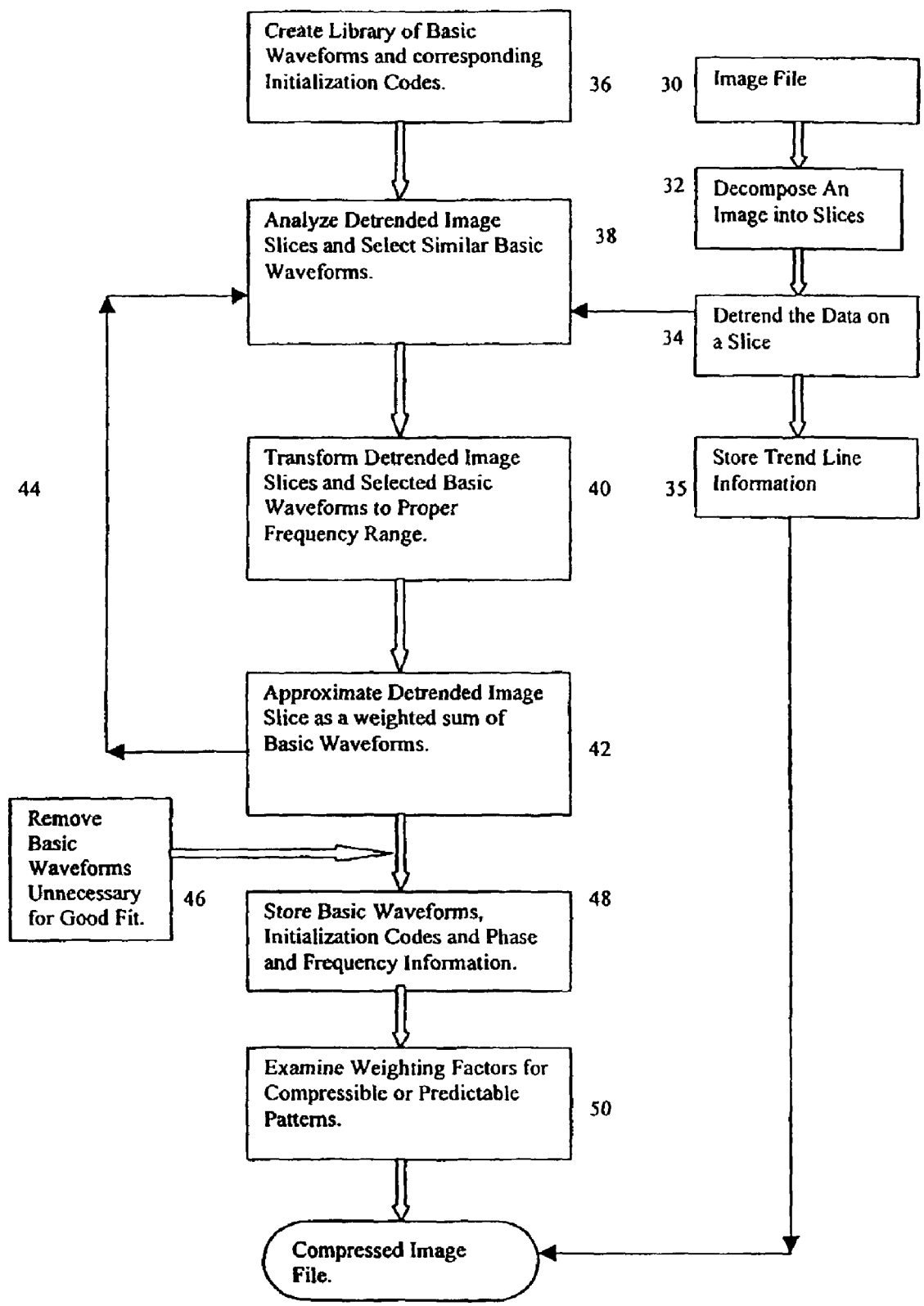
FIG. 2 is a flow chart showing the steps in general in a compression system for image files according to an embodiment of the present invention.

A flowchart of a preferred embodiment of the present invention, in general, for compression of image files is shown in FIG. 2. The process begins within image file 30 in any one of a number of common formats. An image from the image file is then decomposed in step 32 into "slices," a single vertical or horizontal scan line on an analog screen or a single vertical or horizontal line of pixels in a digital image. The maximum length of the slice is externally imposed by the size of the image but multiple shorter slices comprising the maximum length may be used. The data on the slice is either the gray level at each position in grayscale format or the color level, at each position in any other format.

In step 34, the data on the image slice is then considered as a one-dimensional collection of ordered data points. The slice data, which is either a gray level or a color level, often shows a definite trend, either increasing or decreasing over an extended span. It does not necessarily appear oscillatory and does not necessarily have the short-term periodic structure of chaotic waveforms. The solution to this problem can be achieved by taking the slice data and removing the trend line from the data to produce a detrended image slice. In the cases where there is a discontinuity in the trend of the data across the slice, one can break the slice into a small number of shorter slices and remove the trend from each shorter slice. In one embodiment, the trend line may be replaced by a spline curve fit to the data or any other simple functional approximation of the large scale trends in the data. In another embodiment, the data on the slice is considered to be a one-dimensional collection of ordered data points, and a best-fit least squares regression line is calculated to fit the data. This best-fit line is the trend line, and once it is subtracted from the data, the residual difference, or detrended image slice, formed by subtracting the trend line from the image slice is oscillatory in nature. Trend line information describing the trend line is stored at Step 35 as part of the compressed image file. The detrended image slice is now suitable for compression onto chaotic waveforms.

The present invention uses digital initialization codes to drive a chaotic system onto periodic orbits and to stabilize the otherwise unstable orbits. Each periodic orbit then produces basic waveforms, and the set of basic waveforms ranges from those that are slowly varying over their period to those that exhibit rapid variation. The wide range of variability results from the fact that the waveforms contain harmonics that number from just one or two to cases where there are more than 100 harmonics. Consequently, even the rapid variation in subtle shading of an image can be reproduced by the chaotic waveforms, and sharp transitions are readily reproduced because the chaotic waveforms have high harmonic content.

Thus, the process continues with step 36 in which a library of basic waveforms and corresponding initialization codes is compiled as described in detail below. The library contains all of the basic waveforms and corresponding initialization codes for a particular chaotic system. In addition, key reference information about the waveforms can be stored efficiently in a catalog file. The information in the library can be static for a given embodiment. In most applications, the catalog file contains all relevant information and can be retained while the waveforms can be discarded to save storage space.

Figure 3:
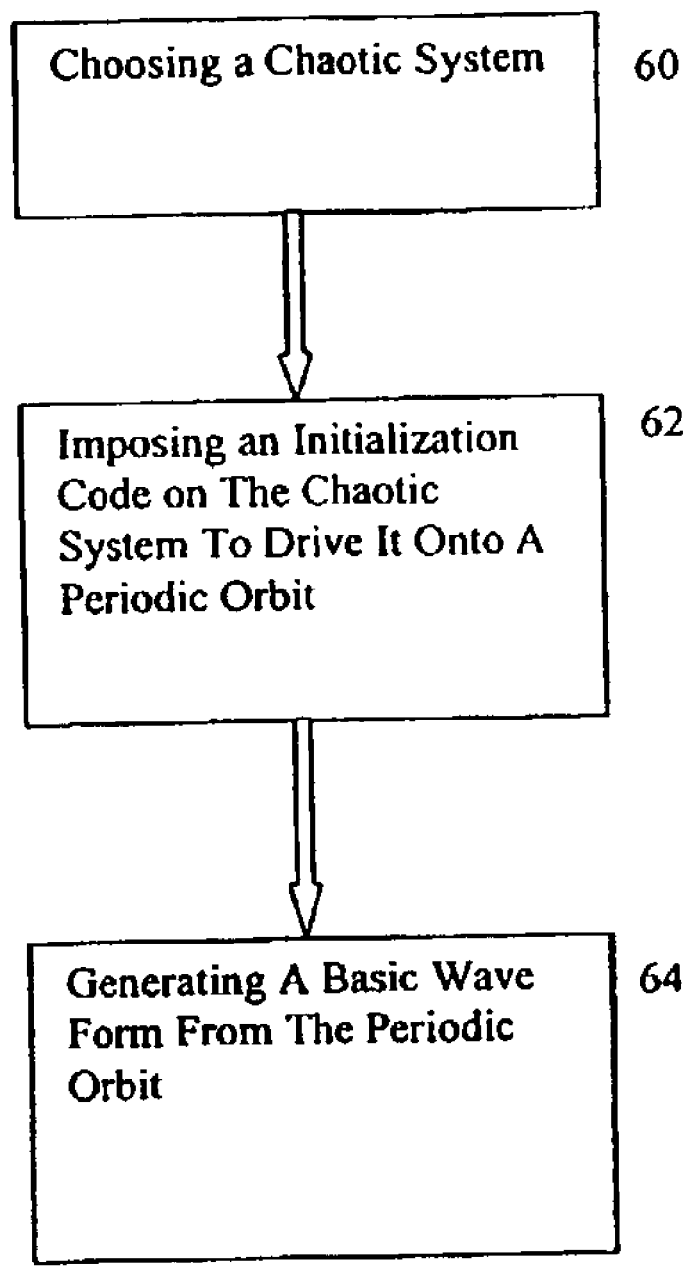
FIG. 3 is a flow chart showing in greater detail the creation of a library of basic waveforms according to an embodiment of the present invention.

FIG. 3 is a flow chart showing in greater detail the creation of the library of basic waveforms and corresponding initialization codes for a preferred embodiment. The first step 60 is choosing a chaotic system, to be driven onto periodic orbits to produce the basic waveforms. In a preferred embodiment, the chaotic system is a double-scroll oscillator [S. Hayes, C. Grebogi, and E. Ott, Communicating with Chaos, Phys. Rev. Lett. 70, 3031 (1993)], described by the differential equations $$C1\dot{v}_{c1}=G(v_{c2}-V_{c1})-g(V_{c1})$$

$$C2\dot{v}_{c2}=G(v_{c1}-v_{c2})+i_L$$

$$Li_L=-v_{c2},$$

where $$m_1 v, \text{ if } -B_p \leq v \leq B_p;$$

$$g(v)=m_0(v+B_p)-m_1 B_p, \text{ if } v \leq -B_p;$$

$$m_0(v-B_p)+m_1 B_p, \text{ if } v \geq B_p$$

Figure 4:
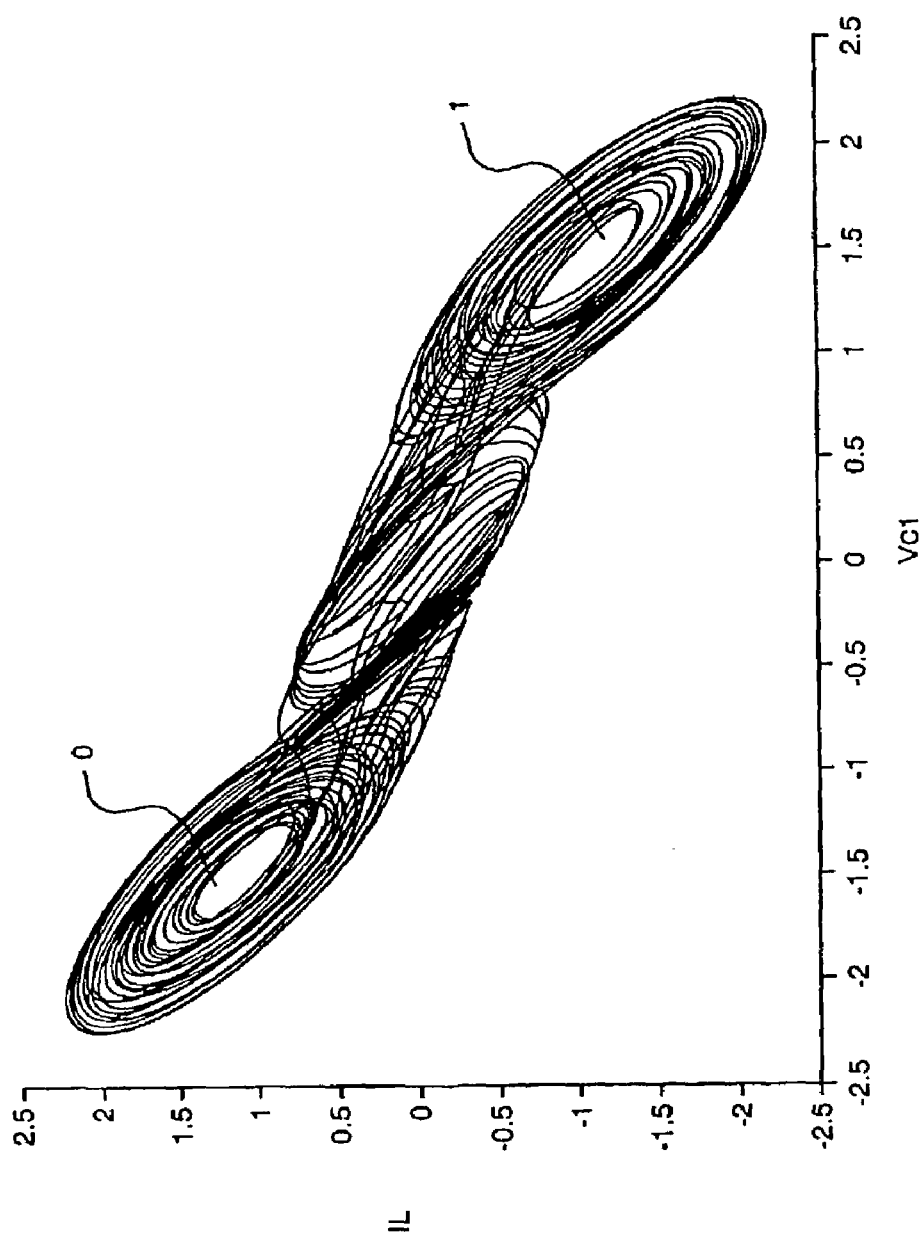
FIG. 4 is a plot of the double scroll oscillator resulting from the given differential equations and parameters.

The attractor that results from a numerical simulation using the parameters $C1=\frac{1}{9}$, $C2=1$, $L=\frac{1}{7}$, $G=0.7$, $m_0=-0.5$, $m_1=-0.8$, and $B_p=1$ has two lobes, each of which unstable fixed point, as shown in FIG. 4.

Because of the chaotic nature of this oscillator's dynamics, it is possible to take advantage of sensitive dependence on initial conditions by carefully choosing small perturbations to direct trajectories around each of the loops of the oscillator. This ability makes it possible, through the use of an initialization code, to drive the chaotic system onto a periodic orbit that is used to produce a basic waveform.

Figure 5:
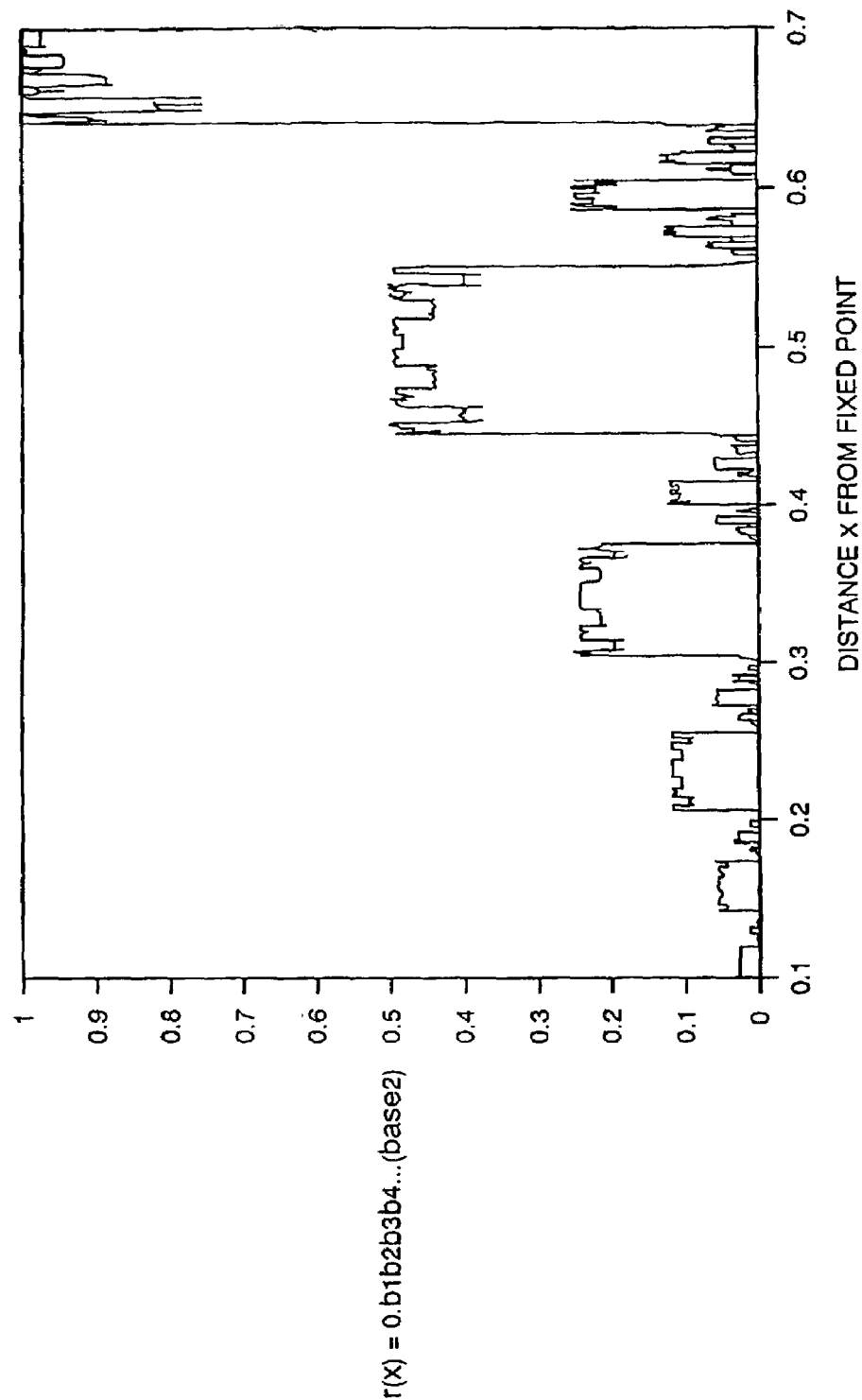
FIG. 5 is a plot of the function r(x) for twelve loops around the double scroll oscillator.

There are a number of means to control the chaotic oscillator. In a preferred embodiment, a Poincare surface of section is defined on each lobe by intersecting the attractor with the half planes $i_L=\pm GF$, $|v_{c1}| \leq F$, where $F=B_p(m_0-m_1)/(G+m_0)$. When a trajectory intersects one of these sections, the corresponding bit can be recorded. Then, a function $r(x)$ is defined, which takes any point on either section and returns the future symbolic sequence for trajectories passing through that point. If $1_1, 1_2, 1_3, \ldots$ represent the lobes that are visited on the attractor (so $1_i$ is either a 0 or a 1), and the future evolution of a given point $x_0$ is such that $x_0 \rightarrow 1_1, 1_2, 1_3, \ldots, 1_N$ for some number N of loops around the attractor, then the function $r(x)$ is chosen to map $x_0$ to an associated binary fraction, so $r(x_0)=0.1_1 1_2 1_3 \ldots 1_n$, wherein this represents a binary decimal (base 2). Then, when $r(x)$ is calculated for every point on the cross-section, the future evolution of any point on the cross-section is known for N iterations. The resulting function is shown in FIG. 5, where $r(x)$ has been calculated for 12 loops around the attractor.

Control of the trajectory can be used, as it is here, for initialization of the chaotic system and also for transmission of a message. Control of the trajectory begins when it passes through one of the sections, say at $x_0$. The value of $r(x_0)$ yields the future symbolic sequence followed by the current trajectory for N loops. For the transmission of a message, if a different symbol in the Nth position of the message sequence is desired, $r(x)$ can be searched for the nearest point on the section that will produce the desired symbolic sequence. The trajectory can be perturbed to this new point, and it continues to its next encounter with a surface. This procedure can be repeated as many times as is desirable.

The calculation of $r(x)$ in a preferred embodiment was done discretely by dividing up each of the cross-sections into 2001 partitions ("bins") and calculating the future evolution of the central point in the partition for up to 12 loops around the lobes. As an example, controls were applied so that effects of a perturbation to a trajectory would be evident after only 5 loops around the attractor. In addition to recording $r(x)$, a matrix M was constructed that contains the coordinates for the central points in the bins, as well as instructions concerning the controls at these points. These instructions simply tell how far to perturb the system when it is necessary to apply a control. For example, at an intersection of the trajectory with a cross-section, if $r(x_0)$ indicates that the trajectory will trace out the sequence 10001, and sequence 10000 is desired, then a search is made for the nearest bin to $x_0$ that will give this sequence, and this information is placed in M. (If the nearest bin is not unique, then there must be an agreement about which bin to take, for example, the bin farthest from the center of the loop.) Because the new starting point after a perturbation has a future evolution sequence that differs from the sequence followed by $x_0$ by at most the last bit, only two options need be considered at each intersection, control or no control. In an analog hardware implementation of the preferred embodiment, the perturbations are applied using voltage changes or current surges. In a software implementation of the preferred embodiment, the control matrix M would be stored along with the software computing the chaotic dynamics so that when a control perturbation is required, the information would be read from M.

A further improvement involves the use of microcontrols. For a preferred embodiment in software, each time a trajectory of the chaotic system passes through a cross-section, the simulation is backed-up one time step, and the roles of time and space are reversed in the Runge-Kutta solver so that the trajectory can be integrated exactly onto the cross-section without any interpolation. Then, at each intersection where no control is applied, the trajectory is reset so that it starts at the central point of whatever bin it is in. This resetting process can be considered the imposition of microcontrols. It removes any accumulation of round-off error and minimizes the effects of sensitive dependence on initial conditions. It also has the effect of restricting the dynamics of the chaotic attractor to a finite subset of the full chaotic attractor although the dynamics still visit the full phase space. These restrictions can be relaxed by calculating $r(x)$ and M to greater precision at the outset.

As also shown on FIG. 3, the next step 62 in creating the library of initialization codes and basic waveforms is the imposition of an initialization code on the chaotic system. The initialization code drives the chaotic system onto a periodic orbit and stabilizes the otherwise unstable periodic orbit. More specifically, the chaotic system is driven onto a periodic orbit by sending it a repeating code. Different repeating codes lead to different periodic orbits. For a large class of repeating codes, the periodic orbit reached is dependent only on the code segment that is repeated, and not on the initial state of the chaotic system (although the time to get on the periodic orbit can vary depending on the initial state). Consequently, it is possible to send an initialization code that drives the chaotic system onto a known periodic orbit. For embodiments in software, one can also choose a fixed initial condition, which has the effect of making more of the initialization codes usable.

These special repeating codes lead to unique periodic orbits for all initial states, so that there is a one-to-one association between a repeating code and a periodic orbit. However, for some repeating codes, the periodic orbits themselves change as the initial state of the chaotic system changes. Consequently, repeating codes can be divided into two classes, initializing codes and non-initializing codes. The length of each periodic orbit is an integer multiple of the length of the repeating code. This is natural, since periodicity is attained only when both the current position on the cross-section as well as the current position in the repeating code is the same as at some previous time. To guarantee that the chaotic system is on the desired periodic orbit, it is sufficient that the period of the orbit is exactly the length of the smallest repeated segment of the initializing code.

Figure 6:
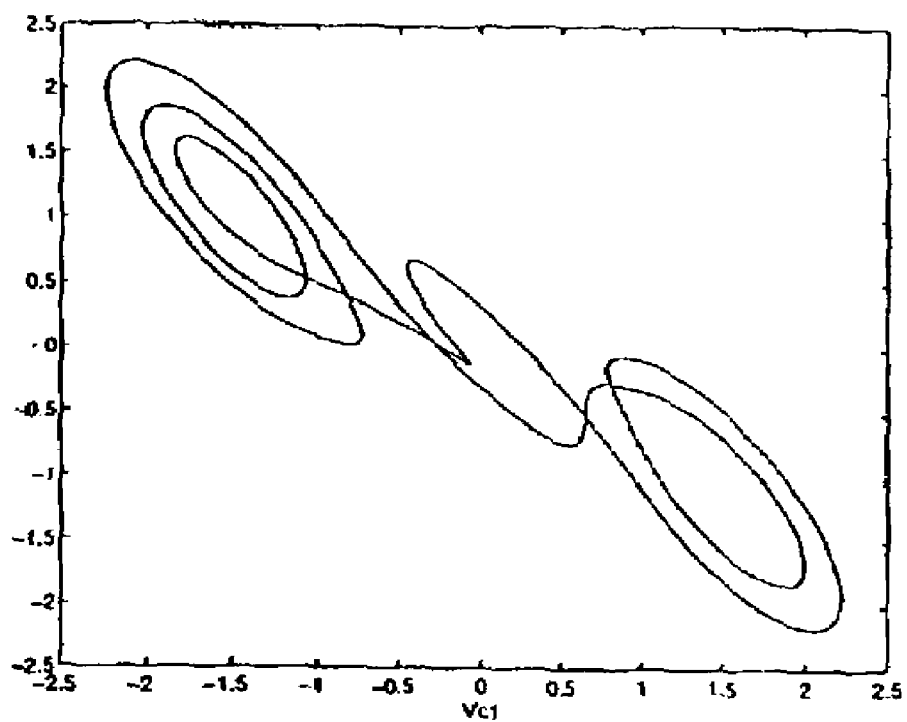
FIG. 6 is a plot of the periodic orbit of the double scroll oscillator resulting from a 5-bit initialization code (01011).

The number of initializing codes has been compared with the number of bits used in the initialization code, and it appears that the number of initializing codes grows exponentially. This is a promising result, since it means that there are many periodic orbits from which to choose. As an example, the compressed initializing code 01011 was repeated for the double-scroll oscillator of a preferred embodiment. The chaotic dynamics in FIG. 4 are driven onto the periodic orbit shown in FIG. 6, which periodic orbit is stabilized by the control code.

As is further shown on FIG. 3, the next step 64 in creating the library is generating a basic waveform, i.e. a one-dimensional, periodic waveform, for each periodic orbit by taking the x-, y-, or z-component (or a combination of them) of the periodic orbit over time. By sampling the amplitude of the waveform over time, e.g. using audio standard PCM 16, one can produce a digital version. These basic waveforms can be highly complex and have strong harmonic structure. The basic waveforms can have more than 100 strong harmonics for some initialization codes, and an important factor that contributes to the performance of the compression technology is the fact that complex basic waveforms with 100 strong harmonics can be produced with the same number of bits in the initialization code as simpler basic waveforms with only a few harmonics. This is indicative of the potential for compression inherent in this system since complex basic waveforms are produced as easily as simple basic waveforms. This is only possible because of the nonlinear chaotic nature of the dynamical system.

The chaotic system can be implemented entirely in software. The chaotic system in such an implementation is defined by a set of differential equations governing the chaotic dynamics, e.g, the double scroll equations described above. The software utilizes an algorithm to simulate the evolution of the differential equations, e.g., the fourth order Runge-Kutta algorithm.

The chaotic system can also be implemented in hardware. The chaotic system is still defined by a set of differential equations, but these equations are then used to develop an electrical circuit that will generate the same chaotic dynamics. The procedure for conversion of a differential equation into an equivalent circuit is well-known and can be accomplished with analog electronics, microcontrollers, embedded CPU's, digital signal processing (DSP) chips, or field programmable gate arrays (FPGA), as well as other devices known to one skilled in the art, configured with the proper feedbacks. The control information is stored in a memory device, and controls are applied by increasing voltage or inducing small current surges in the circuit.

Returning to the flow chart in FIG. 2, at step 38, a detrended image slice to be compressed is chosen and compared to the basic waveforms in the library. The comparison may be effected by extracting key reference information from the detrended image slice and correlating it with the information in the catalog file. Those basic waveforms that are most similar, based on selected criteria, to the detrended image slice are then selected and used to build an approximation of the detrended image slice.

There are many approaches that can be employed to compare the basic waveforms and the detrended image slice, including a comparison of numbers of zero crossings; number and relative power of harmonics in the frequency spectrum; a projection onto each basic waveform; and geometric comparisons in phase space. The technique chosen is dependent upon the specific application under consideration, but in a preferred embodiment, it has been effective to encapsulate the basic waveform information in a vector that describes the (normalized) magnitudes of the strongest harmonics.

A comparator matrix is created to contain the (normalized) spectral peaks information for each basic waveform in the library. Then, for the detrended image slice, a comparison is made between the spectrum of the detrended image slice, and the spectrum of the basic waveforms. In the encapsulated form, the basic waveform that is the closest match can be found merely by taking inner products between the detrended image slice vector and the basic waveform vectors of spectral peaks. The best-match basic waveform is selected as the first basis function, along with other close matches and basic waveforms that closely matched the parts of the spectrum that were not fit by the first basis function. In different applications, there may be a variety of approaches to choosing the basic waveforms to keep as basis functions, but the general approach is to project the detrended image slice onto the library of basic waveforms. Finally, in some applications it is unnecessary or undesirable to keep a library of basic waveforms; in these cases the basic waveforms are recreated as needed by applying the corresponding initialization codes to the chaotic system.

After the appropriate basic waveforms have been selected, one can begin to approximate the detrended image slice. In step 40, all of the selected basic waveforms and the detrended image slice are transformed to a proper frequency range, either the detrended image slice range or a fixed reference range, in which a comparison can be made. For example, they can be resampled so that they are in a fixed frequency range. This can be accomplished through standard resampling techniques. Typically, the resampling is done to obtain better resolution of the signals (i.e., upsampling), so no information is lost in the process.

Once the detrended image slice and all the basic waveforms are in the proper frequency range, an approximation, in step 42, is possible. A necessary component is to align the basic waveforms properly with the waveforms of the detrended image slice (i.e., adjust the phase), as well as to determine the proper amplification factor or weighting factor (i.e., adjust the amplitude). There are a number of ways this can be done, but the general approach involves a weighted sum of the chosen basic waveforms. The weighting factors are found by minimizing some error criterion or cost function, and will typically involve something equivalent to a least-squares fit to the detrended image slice sample. A particularly efficient approach used in a preferred embodiment is to take all of the basic waveforms and split them into a complexified pair of complex conjugate waveforms. This can be accomplished by taking a basic waveform, $f_1$, calculating the fast Fourier transform of the basic waveform, call it $F_1$, then splitting the transform in the frequency domain into positive and negative frequency components $F_{1pos}$, $F_{1neg}$. The positive and negative frequency components are then transformed separately back to the time domain by using the inverse Fourier transform, resulting in a pair of complex conjugate waveforms that vary in the time domain, $f_{1pos}$ and $f_{1neg}$, where $f_{1pos}=(f_{1neg})^*$. The key benefit of the splitting and complexification of the waveforms is that when the complex conjugate waveforms are added together with any complex conjugate pair of weighting factors, the result is a real waveform in the time domain, so if $\alpha$ and $\alpha^*$ are the coefficients, then $\alpha f_{1pos}+\alpha^* f_{1neg}$ is a real function, and if the factors are identically 1 the original function $f_1$ is reproduced (adjusted to have zero mean). Further, by choosing $\alpha$ and $\alpha^*$ properly, the phase of the waveform can be automatically adjusted, although the net effect includes a phase shift of the harmonics of the waveform, it has been effective in one embodiment. In practice, the phase and amplitude adjustments can be achieved at once for all of the basic waveforms simply by doing a least squares fit to the detrended image slice using the complexified pairs of complex conjugate waveforms derived from the basic waveforms. The weighting functions from the least squares fit are multiplied by the associated waveforms and summed to form the approximation to the detrended image slice. This approximation can then be tested to determine if the fit is sufficiently good in step 42, and if further improvement is necessary the process can be iterated 44.

The next stage of the compression, step 46, involves examining the approximation and determining if some of the basic waveforms used are unnecessary for achieving a good fit. Unnecessary basic waveforms can be eliminated to improve the compression. After removing unnecessary basic waveforms, the initialization codes for the remaining basic waveforms, the weighting factors, and the phase and frequency information can be stored in step 48 as part of the compressed image file.

In step 50, , the sequence of images can be examined and when there is some consistency to the waveforms and control codes used or when an overall trend can be identified between images in the sequence, then further compression results when the first image is stored in the usual compressed format, along with information which encapsulates the sequence-change information along with any correction bits which are deemed necessary. Finally, the compressed image file 52 comprising the stored trend line information, the stored initialization codes, the stored phase and frequency information and the stored weighting factors is produced. The compressed image file can be stored and transmitted using all storage and transmission means available for digital files.

A preferred embodiment of the present invention for decompression of a compressed image file involves reversing the steps taken to compress the image file. The stored initialization codes are stripped out and used to regenerate the basic waveforms, which are transformed to the proper frequency range and combined according to the stored weighting factors to reproduce the detrended image slice. The trend line information is then used to regenerate the trend line which is added to the detrended image slice to produce an approximation of the original image slice.

Another preferred embodiment of the present invention is now described in more detail, but there are many variations that produce equivalent results. FIG. 7 shows an image file composed of 150×1024 pixels which is a grayscale image of mountaintops and clouds. FIG. 8 shows the data from a single slice, where the horizontal axis corresponds to the pixel number and the vertical axis represents the grayscale level. FIG. 9 shows the slice after detrending, and FIG. 10 shows the approximation of the slice using the chaotic waveforms. When all of the slices have been represented in the chaotic waveforms and the trend lines have been added back, the reproduced image appears in FIG. 11. In general, the detrended image slice length is an adjustable parameter, and in some implementations it would even vary during the compression of a single image file.

The first step in the process is to analyze the detrended image slice to determine the frequency content of the detrended image slice. This is done by calculating the fast Fourier transform ("FFT") of the slice and then taking the magnitude of the complex Fourier coefficients. The spectrum of coefficients is then searched for peaks, and the peaks are further organized into harmonic groupings. At the first iteration, the harmonic group associated with the maximum signal power is extracted. This is done by determining the frequency of the maximum spectral peak, and then extracting any peaks that are integer multiples of the maximum spectral peak. These peaks are then stored in a vector, $v_{peaks}$, to give the first harmonic grouping. (In practice, further refinement of the harmonic grouping is necessary, since the fundamental or root frequency of a harmonic grouping is often not the maximum peak. Rather, the root frequency would be an integer subharmonic of the maximum frequency, so if $F_{max}$ is the frequency with the maximum power, harmonic groups of peaks based on a root frequency of $F_{max}/2$, then $F_{max}/3$, etc. would be extracted, and then the first harmonic group to be considered would be that one which captures the greatest power in the peaks.) The vector containing the first harmonic group is taken to be of length 64 in this embodiment, and, although other implementations may set different lengths, it is necessary to allow for a large number of harmonics in order to capture the complexity of the basic waveforms. The goal at the next stage of the compression is to find basic waveforms that have similar harmonic structure to the detrended image slice in question.

The second step in the process is to find basic waveforms in the library of basic waveforms that exhibit similar spectral characteristics. This process is rather simple because the library is established ahead of time and each basic waveform in the library has already been analyzed to determine its harmonic structure. Consequently, for each waveform in the library, a vector of harmonic peaks has been extracted, call these vectors $p_i$, where i varies over all waveforms and assume that 64 peaks have again been taken. These vectors are first normalized to have unit length and are then placed in a matrix, M, that has 64 columns and as many rows as there are waveforms (up to around 26,000 in one embodiment) In order to keep track of which waveform is associated with which row in M, an index table is set up that contains the control code associated with each row in M. Then, to find the closest match to the music vector, $v_{peaks}$, we can calculate the matrix product $x_{projection} = M v_{peaks}$ and find the maximum value in $x_{projection}$. The row that gives the maximum value corresponds to the basic waveform that matches the detrended image slice most closely. We can then extract the corresponding initialization code from the index table, and we can generate the desired basic waveform or, if the basic waveforms have been stored digitally, we can just load it from the library of basic waveforms. In many instances, it is worthwhile to choose more than one close match to the detrended image slice, since a weighted sum of several basic waveforms is necessary to produce a suitable match; these can be taken by selecting the largest values in $X_{projection}$, and taking the associated basic waveforms indicated in the index table.

The third step in the process requires adjustment of the period and phase of the basic waveforms. Since the basic waveforms are periodic, the adjustment process can be completed without introducing any errors into the basic waveforms. This can be done entirely in the frequency domain, so the transformations are made to the FFT of the basic waveforms, using standard techniques known in signal processing. The basic waveforms will be adjusted so that the root frequencies of the basic waveforms match the root frequencies of the detrended image slice. To do this, the FFT of the basic waveform is padded with zeros to a length that corresponds to the length of the FFT of the detrended image slice. The complex amplitude of the root frequency of the basic waveform is then shifted up to the root frequency of the detrended image slice, and the remaining harmonics of the root frequency of the basic waveform are shifted up to corresponding multiples of the root frequency of the detrended image slice (the vacated positions are filled with zeros). After the shifting, if the inverse FFT is calculated, the basic waveforms will all have the same root frequency as the detrended image slice; however, the phase of the basic waveforms may not match the phase of the detrended image slice. So, before calculating the inverse FFT, the phase of the chaotic waveforms is adjusted so that the phase of the basic waveform matches the phase of the detrended image slice.

The phase adjustment is achieved by multiplying the complex Fourier amplitudes in the FFT by an appropriate phase factor of the form $e^{i\theta}$ where $\theta$ is chosen to produce the correct phase for the peak corresponding to the maximum peak in the detrended image slice, and the phases of the other spectral peaks are adjusted to produce an overall phase shift of the basic waveform. Note that by multiplying by a phase factor, the overall spectrum of the signal is unchanged. Different embodiments of the technology use slightly different approaches to the phase adjustment, e.g., one can adjust the phase through filtering, or the phase adjustment can be calculated by a minimization principle designed to minimize the difference between the detrended image slice and the basic waveform, or by calculating the cross-correlation between the basic waveforms and the detrended image slice. All approaches give roughly equivalent results.

The fourth step in the process is to compute the weighting factors for the sum of basic waveforms that produces the closest match to the detrended image slice. This calculation is done using a least-squares criterion to minimize the residual error between the detrended image slice and the fitted (sum of) basic waveforms. In the event that the first group of basic waveforms does not produce a close enough match to the detrended image slice, the process is iterated until the desired representation is reached. The compression results from the fact that the compressed chaotic version requires only information about the initialization codes, weighting factors, phase and frequency and trend lines for a few basic waveforms, rather than 8-bit or 16-bit amplitude information for each of the data points in the detrended image slice.

What is claimed is:

1. A method of compressing an image file comprising:
choosing an image to be compressed and decomposing the image into slices;
finding a trend line for each slice and calculating trend line information describing the trend line;
calculating for each slice a detrended image slice, by subtracting from each slice its trend line and storing the trend line information describing the trend line;
choosing a chaotic system;
applying selected digital initialization codes to the chaotic system such that each initialization code produces a periodic orbit and stabilizes the otherwise unstable periodic orbit;
generating a basic waveform for each periodic orbit such that the basic waveform is in a one-to-one correspondence to the initialization code for the periodic orbit;
selecting basic waveforms to be used with each detrended image slice and storing their corresponding initialization codes; and
providing a compressed image file, wherein the compressed image file comprises the initialization codes and trend line information for each detrended slice.

2. The method of compressing an image file of claim 1 further comprising:
calculating weighting factors to create a weighted sum of the selected basic waveforms to approximate each detrended image slice and storing the weighting factors; and
removing from the weighted sum of the selected basic waveforms any selected basic waveforms not deemed necessary to approximate sufficiently well the image file and of removing the corresponding stored initialized codes.

3. The method of compressing an image file of claim 1 further comprising:
calculating weighting factors to create a weighted sum of the selected basic waveforms to approximate each detrended image slice and storing the weighting factors; and
identifying trends over sections of compressed image file and replacing the stored weighting factors for the sections of compressed image file by a suitable function.

4. The method of claim 1, further comprising providing a suitable function to weight the selected basic waveforms.

5. The method of claim 1 further comprising:
choosing a compressed image file;
stripping stored initialization codes out of the compressed image file and applying the stored initialization codes to a chaotic system substantially the same as the chaotic system used in producing the compressed image file to produce the corresponding basic waveforms;
stripping the trend line information out of the compressed image file and using the trend line information to regenerate a trend line to add to the detrended image slice to produce an approximation of an original image slice.

6. The method of claim 1, further comprising:
transforming the detrended image slice and the selected basic waveforms to a proper frequency range and storing frequency information describing the transformation.

7. The method of claim 1, further comprising:
calculating weighting factors to create a weighted sum of the selected basic waveforms to approximate each detrended image slice and storing the weighting factors.

8. The method of claim 1, further comprising:
transforming the detrended image slice and the selected basic waveforms to a proper frequency range and storing frequency information describing the transformation; and
calculating weighting factors to create a weighted sum of the selected basic waveforms to approximate each detrended image slice and storing the weighting factors.

9. The method of claim 1, further comprising:
transforming the detrended image slice and the selected basic waveforms to a proper frequency range and storing frequency information describing the transformation;
calculating weighting factors to create a weighted sum of the selected basic waveforms to approximate each detrended image slice and storing the weighting factors; and
combining the stored trend line information, the stored initialization codes, the stored frequency information and the stored weighting factors for each detrended image slice to comprise a compressed image file.

10. The system of claim 1, further comprising:
transforming the detrended image slice and the selected basic waveforms to a proper frequency range and storing frequency information describing the transformation;
calculating weighting factors to create a weighted sum of the selected basic waveforms to approximate each detrended image slice and storing the weighting factors;
providing the weighting factors and the frequency information in the compressed file;
stripping the stored frequency information out of the compressed image file and using the stored frequency information to transfer the basic waveform to the proper frequency range; and
combining the basic waveforms according to the stored weighting factors to produce a detrended image slice.

11. A system of compressing an image file comprising:
means for choosing an image to be compressed and decomposing the image into slices;
means for finding a trend line for each slice and calculating trend line information describing the trend line;
means for calculating for each slice a detrended image slice, by subtracting from each slice its trend line and storing the trend line information describing the trend line;
means for choosing a chaotic system;
means for applying selected digital initialization codes to the chaotic system such that each initialization code produces a periodic orbit and stabilizes the otherwise unstable periodic orbit;
means for generating a basic waveform for each periodic orbit such that the basic waveform is in a one-to-one correspondence to the initialization code for the periodic orbit;

means for selecting basic waveforms to be used with each detrended image slice and storing their corresponding initialization codes;

means for providing a compressed image file, wherein the compressed file comprises the initialization codes and trend line information for each detrended slice.

12. The means for compressing an image file of claim 11 further comprising:

means for calculating weighting factors to weighted sum of the selected basic waveforms to approximate each detrended image slice and storing the weighting factors; and means for removing from the weighted sum of the selected basic waveforms any selected basic waveforms not deemed necessary to approximate sufficiently well the image file and the means for removing the corresponding stored initialized codes.

13. The means for compressing an image file of claim 11 further comprising:

means for calculating a suitable function to weight the selected basic waveforms; and means for identifying trends over sections of compressed image file.

14. The system of claim 11 further comprising:

means for choosing a compressed image file;

means for stripping stored initialization codes out of the compressed image file and applying the stored initialization codes to a chaotic system substantially the same as the chaotic system used in producing the compressed image file to produce the corresponding basic waveforms;

means for stripping the trend line information out of the compressed image file and using the trend line information to regenerate a trend line to add to the detrended image slice to produce an approximation of an original image slice.

15. The system of claim 11 further comprising:

means for transforming the detrended image slice and the selected basic waveforms to a proper frequency range and storing frequency information describing the transformation.

16. The system of claim 11 further comprising:

means for calculating weighting factors to create a weighted sum of the selected basic waveforms to approximate each detrended image slice and storing the weighting factors.

17. The system of claim 11 further comprising:

means for transforming the detrended image slice and the selected basic waveforms to a proper frequency range and storing frequency information describing the transformation; and means for calculating weighting factors to create a weighted sum of the selected basic waveforms to approximate each detrended image slice and storing the weighting factors.

18. The system of claim 11 further comprising:

means for transforming the detrended image slice and the selected basic waveforms to a proper frequency range and storing frequency information describing the transformation;

means for calculating weighting factors to create a weighted sum of the selected basic waveforms to approximate each detrended image slice and storing the weighting factors; and means for combining the stored trend line information, the stored initialization codes, the stored frequency information and the stored weighting factors for each detrended image slice to comprise a compressed image file.

19. The system of claim 11 further comprising:

means for transforming the detrended image slice and the selected basic waveforms to a proper frequency range and storing frequency information describing the transformation;

means for calculating weighting factors to create a weighted sum of the selected basic waveforms to approximate each detrended image slice and storing the weighting factors;

means for providing the weighting factors and the frequency information in the compressed file;

means for stripping the stored frequency information out of the compressed image file and using the stored frequency information to transfer the basic waveform to the proper frequency range; and means for combining the basic waveforms according to the stored weighting factors to produce a detrended image slice.

20. A system for compressing an image file comprising:

a chaotic system;

a compression controller to apply selected digital initialization codes to the chaotic system to drive it onto periodic orbits and to produce a basic waveform for each periodic orbit that is in a one-to-one correspondence with the initialization code for the periodic orbit;

an image decomposer to decompose an image to be compressed into slices;

a slice data detrender to calculate for each slice a detrended image slice by subtracting from each slice its trend line and to store the trend line information;

a waveform comparator to select the basic waveforms to be used with each detrended image slice and to store their corresponding initialization codes; and a storage device to combine at least the stored trend line information, and the stored initialization codes for each detrended image slice to comprise a compressed image file.

21. The system of claim 20 further comprising:

a waveform weighter to transform the detrended image slice and the selected basic waveforms to a proper frequency range and to store frequency information describing the transformation.

22. The system of claim 20, further comprising:

a waveform weighter to calculate weighting factors to create a weighted sum of the selected basic waveforms to approximate each detrended image slice and to store the weighting factors.

23. The system of claim 20 further comprising:

a waveform weighter (i) to transform the detrended image slice and the selected basic waveforms to a proper frequency range and to store frequency information describing the transformation and (ii) to calculate weighting factors to create a weighted sum of the selected basic waveforms to approximate each detrended image slice and to store the weighting factors.

24. The system of claim 20 further comprising:

a waveform weighter (i) to transform the detrended image slice and the selected basic waveforms to a proper frequency range and to store frequency information describing the transformation and (ii) to calculate weighting factors to create a weighted sum of the selected basic waveforms to approximate, each detrended image slice and to store the weighting factors, wherein the storage device combines at least the stored trend line information and the stored initialization codes, the stored frequency information and the stored weighting factors for each detrended image slice to comprise a compressed image file.

25. A method of compressing a data signal, using a chaotic system, comprising:
   identifying a trend in the portion of the data signal;
   removing the trend from the portion of the data signal to provide detrended data;
   causing the chaotic system to assume a periodic orbit by applying an initialization code to the chaotic system;
   generating a periodic waveform for the periodic orbit;
   weighting the periodic waveform to approximate at least a portion of the detrended data signal; and
   merging the initialization code, information about the identified trend, and a representation of the weighting, to compress the portion of the data signal.

26. The method of claim 25, including stabilizing the periodic orbit.

27. The method of claim 25, wherein identifying the trend includes determining a mathematical model for the trend.

28. The method of claim 25, wherein the data signal comprises image data.

29. The method of claim 25, wherein the data signal comprises audio and image data.

30. A method of compressing a data signal, using a chaotic system, comprising:
   a. causing the chaotic system to assume a plurality of periodic orbits by applying a plurality of initialization codes to the chaotic system;
   b. generating a periodic waveform for each of a subset of the periodic orbits;
   c. weighting a subset of the generated periodic waveforms to approximate at least a portion of the data signal; and
   d. merging the initialization codes and information representative of the weighting, to compress the portion of the data signal.

31. The method of claim 30, including assigning a zero weight to at least one of the subset of generated periodic waveforms.

32. A method of compressing a slice of image data using a chaotic system, comprising:
   a. causing the chaotic system to assume a plurality of periodic orbits by applying a plurality of initialization codes to the chaotic system;
   b. generating a periodic waveform for each of the periodic orbits;
   c. weighting the periodic waveforms to approximate at least a portion of the slice of image data; and
   d. merging the initialization codes and information representative of the weighting, to compress the slice of image data.

33. A method of compressing a slice of image data using a chaotic system, comprising:
   a. causing the chaotic system to assume at least one periodic orbit by applying at least one initialization code to the chaotic system;
   b. generating a periodic waveform for each of a subset of the at least one periodic orbit;
   c. weighting a subset of the generated periodic waveforms to approximate at least a portion of the slice of image data; and
   d. merging the at least one initialization code and information representative of the weighting, to compress the slice of image data.

34. A method of compressing a data signal, using a chaotic system, comprising:
   a. causing the chaotic system to assume a periodic orbit by applying an initialization code to the chaotic system;
   b. generating a periodic waveform for the periodic orbit;
   c. weighting the periodic waveform to approximate a first portion of the data signal;
   d. identifying a correlation between data in the first portion of the data signal and data in at least one other portion of the data signal;
   e. merging the initialization code, a representation of the weighting, and a representation of the correlation, to represent the first portion of the data signal and the at least one other portion of the data signal, to compress the data signal.

35. A method of decompressing a compressed representation of a first data signal, the compressed representation produced using a first chaotic system and containing an initialization code, comprising:
   a. causing a second chaotic system, substantially identical to the first chaotic system, to assume a predetermined periodic orbit by applying the initialization code to the second chaotic system;
   b. generating a periodic waveform for the periodic orbit; and
   c. applying a predetermined weighting to the periodic waveform to produce at least a portion of a second data signal substantially identical to at least a portion of the first data signal.

36. The method of claim 35, including stabilizing the periodic orbit.

37. The method of claim 35, wherein the compressed representation includes trend information for the at least a portion of the first data signal.

38. The method of claim 37, including applying the trend information to the at least a portion of the second data signal, to substantially reproduce the at least a portion of the first data signal.

39. The method of claim 37, wherein the trend information includes a mathematical model of the trend.

40. The method of claim 35, wherein the data signal comprises image data.

41. The method of claim 35, wherein the data signal comprises audio and image data.

42. A method of decompressing a compressed representation of a first slice of image data, the compressed representation produced using a first chaotic system and containing at least one initialization code, comprising:
   a. causing a second chaotic system, substantially identical to the first chaotic system, to assume at least one predetermined periodic orbit by applying the at least one initialization code to the second chaotic system;
   b. generating a predetermined periodic waveform for each of a subset of the at least one predetermined periodic orbit; and
   c. applying a predetermined weighting to at least one generated predetermined periodic waveform to produce at least a portion of a second slice of image data substantially identical to at least a portion of the first slice of image data.

43. A method of decompressing a compressed representation of a first data signal, the compressed representation produced using a first chaotic system and containing a plurality of initialization codes, comprising:
   a. causing a second chaotic system, substantially identical to the first chaotic system, to assume a plurality of predetermined periodic orbits by applying the initialization codes to the second chaotic system;

b. generating a predetermined periodic waveform for each of a subset of the predetermined periodic orbits; and c. applying a predetermined weighting to at least one generated periodic waveform to produce at least a portion of a second data signal substantially identical to at least a portion of the first data signal.

44. A method of decompressing a compressed representation of a first data signal, the compressed representation produced using a first chaotic system and containing a plurality of initialization codes, comprising:

a. causing a second chaotic system, substantially identical to the first chaotic system, to assume a predetermined periodic orbit by applying the initialization codes to the second chaotic system;

b. generating a periodic waveform for the periodic orbit;

c. applying a predetermined weighting to the periodic waveform to produce a first portion of a second data signal substantially identical to a first portion of the first data signal; and d. applying, to the first portion of the second data signal, a predetermined correlation between data in the first portion of the first data signal and data in at least one other portion of the first data signal, to produce at least one other portion of the second data signal substantially identical to the at least one other portion of the first data signal.

* * * * *